United States Patent [19]

Shibayama et al.

[11] Patent Number: 4,763,545
[45] Date of Patent: Aug. 16, 1988

[54] HYDRAULIC CONTROL SYSTEM FOR AUTOMATIC TRANSMISSION

[75] Inventors: Takashi Shibayama, Isehara; Kazuhiko Sugano, Yokohama, both of Japan

[73] Assignee: Nissan Motor Co., Ltd., Yokohama, Japan

[21] Appl. No.: 915,079

[22] Filed: Oct. 3, 1986

[30] Foreign Application Priority Data

Oct. 5, 1985 [JP] Japan ............................ 60-222433

[51] Int. Cl.$^4$ ............................................. B60K 41/02
[52] U.S. Cl. ......................................... 74/868; 74/866
[58] Field of Search ................ 74/866, 867, 868, 869; 364/424.1

[56] References Cited

U.S. PATENT DOCUMENTS

| | | | |
|---|---|---|---|
| 3,750,495 | 8/1973 | Ito et al. ................................. | 74/866 |
| 4,367,528 | 1/1983 | Kawamoto et al. .............. | 74/866 X |
| 4,485,695 | 12/1984 | Kawamoto ....................... | 74/866 X |
| 4,538,482 | 9/1985 | Hiramatsu ............................ | 74/869 |
| 4,561,328 | 12/1985 | Hiramatsu ........................ | 74/866 X |
| 4,611,285 | 9/1986 | Weisman, II ..................... | 74/867 X |

FOREIGN PATENT DOCUMENTS

| | | | |
|---|---|---|---|
| 0160120 | 11/1985 | European Pat. Off. .............. | 74/866 |
| 2113159 | 9/1978 | Fed. Rep. of Germany ........ | 74/866 |
| 0037140 | 3/1982 | Japan ..................................... | 74/867 |
| 2031533 | 4/1980 | United Kingdom .................. | 74/867 |

OTHER PUBLICATIONS

"Hydraulic Control System for Automatic Transmission", Service Manual of Jan. 1986, published by Nissan Motor Co., Ltd.

Primary Examiner—Leslie A. Braun
Assistant Examiner—David Novais
Attorney, Agent, or Firm—Foley & Lardner, Schwartz, Jeffery, Schwaab, Mack, Blumenthal & Evans

[57] ABSTRACT

A hydraulic control system comprises a control valve with a solenoid valve operatively connected thereto to modulate the characteristic of hydraulic fluid pressure supplied to a friction element that is to be engaged during a shift in speed ratio. The current supplied to the solenoid is varied in ON/OFF manner in accordance with a duty factor computed by a control unit. The control unit includes a memory storing a map containing various duty factors corresponding to various kinds of shifts and determines an adequate duty factor for a shift which is to take place in the transmission. The characteristic of the hydraulic fluid pressure is modulated during a time period variable with vehicle speed and engine torque which are measured by sensors associated with the control unit.

18 Claims, 8 Drawing Sheets

HYDRAULIC CONTROL SYSTEM FOR AUTOMATIC TRANSMISSION

BACKGROUND OF THE INVENTION

The present invention relates to a hydraulic control system, which system can modulate the characteristic of hydraulic fluid pressure supplied to a shifting friction element.

Figure 7:
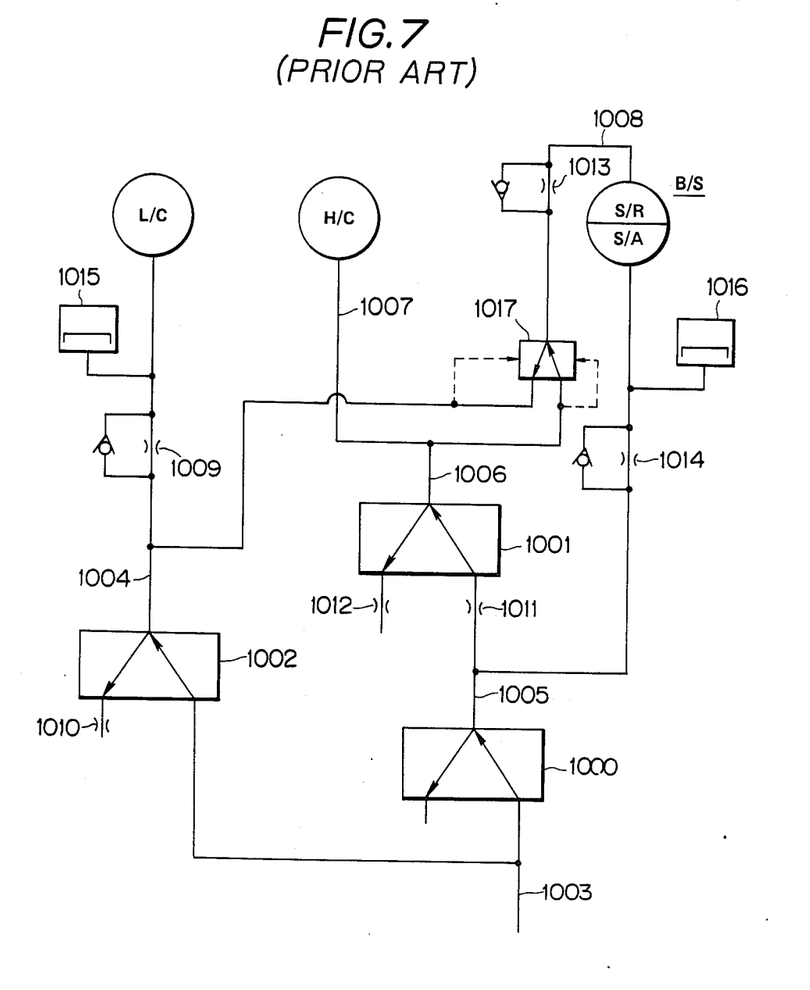
FIG. 7 is a diagrammatic view of the conventional hydraulic control system previously discussed.

Referring to FIG. 7, a known hydraulic control system for an automatic transmission is described. FIG. 7 shows in diagram a high clutch H/C, a low clutch L/C, a band servo B/S of a dual piston type movable to a brake apply position when a servo apply chamber S/A is pressurized with a servo release chamber S/R depressurized or to a brake release position when the servo release chamber S/R is pressurized regardless of whether the servo apply chamber S/A is pressurized or not. The hydraulic control system also comprises a 1-2 shift valve 1000, a 2-3 shift valve 1001, and a 3-4 shift valve 1002. Reference numeral 1003 designated a D range pressure passage, reference numeral 1004 designates a low clutch pressure passage, reference numeral 1005 designates a D2-D4 speed pressure passage, reference numeral 1006 designates a D3-D4 speed passage, reference numeral 1007 designates a high clutch pressure passage, and reference numeral 1008 designates a servo release pressure passage. Shift shock reducing arrangements include orifices 1009, 1010, 1011, 1012, 1013, and 1014, and accumulators 1015 and 1016.

The D range pressure passage 1003 and low clutch pressure passage 1004 play a role in forming a hydraulic fluid passage for establishing the first speed within D range, and the D2-D4 speed pressure passage 1005 also plays a role in forming a hydraulic fluid passage for establishing the second speed within D range, the D3-D4 speed pressure passage 1006, high clutch pressure passage 1007 and servo release pressure passage 1008 also play a role in forming a hydraulic fluid passage for establishing the third speed within D range, and the hydraulic pressure passage for the third speed within D range minus the low clutch pressure passage 1004 and servo release pressure passage 1008 provides a hydraulic fluid passage for the fourth speed within D range.

In selecting D range first speed from N range, the orifices 1009 and low clutch accumulator 1015 play an important role in alleviating shock upon engagement of the low clutch L/C. In shifting from D range first speed to D range second speed, the orifice 1014 and band servo accumulator 1016 play a role in alleviating shock upon application of the band brake B/B by the band servo B/S. In shifting from D range second speed to D range third speed, the supply of fluid pressure to the high clutch and that to the servo release chamber S/R are synchronized by the common orifice 1011 and the occurrence of shift shock is alleviated by the orifices 1011 and 1013. In shifting from D range third speed to D range fourth speed, the discharge of hydraulic fluid from the low clutch L/C and that from the servo release chamber S/R are synchronized by the common orifice 1010. The reference numeral 1017 designates a servo release timing valve which connects the servo release chamber S/R to the high clutch H/C or the low clutch L/C, selectively, in order to effect shifting between the first speed, third speed and fourth speed.

The conventional control system uses orifices to restrict fluid flow and accumulators to modulate rising characteristics of hydraulic fluid pressure. If the specifications of the orifices and accumulators are set, a pattern in which servo actuating hydraulic pressure rises is fixed accordingly and is invariable. Thus, it cannot satisfactorily comply with varying requirements in the case where the torque capacity demand on the same shifting element differs from one to another speed position or in the case where the engine torque varies.

An object of the present invention is to solve the above mentioned problem and provide a hydraulic control system which can easily modulate the characteristic of hydraulic fluid pressure supplied to a shifting friction element.

SUMMARY OF THE INVENTION

According to the present invention, there is provided a hydraulic control system for an automatic transmission having a friction element, comprising:

a source of actuating hydraulic fluid pressure;

a shift valve communicating with said source of actuating hydraulic fluid pressure;

a shift valve having an inlet communicating with said source of actuating hydraulic fluid pressure and an outlet;

means for defining a hydraulic fluid pressure passage having one end communicating with said shift valve and an opposite end communicating with the friction element;

said shift valve having a position where said outlet thereof is connected to said inlet thereof to allow supply of said actuating hydraulic fluid pressure to the friction element via said hydraulic fluid pressure passage;

an electro-hydraulic transducer provided at said hydraulic fluid pressure passage for modulating the characteristic of hydraulic fluid pressure supplied to the friction element in response to a control signal.

According to one embodiment of the present invention, there is provided a hydraulic control system for an automatic transmission for an automotive vehicle having an engine, the transmission having a plurality of friction elements including a predetermined friction element, the transmission being shiftable to one of a plurality of speed ratios by hydraulically engaging the predetermined friction element, and also to another one of the plurality of speed ratios by hydraulically engaging the predetermined friction element, said hydraulic control system comprising:

a source of actuating hydraulic fluid pressure;

a shift valve communicating with said source of actuating hydraulic fluid pressure;

a shift valve having an inlet communicating with said source of actuating hydraulic fluid pressure and an outlet;

means for defining a hydraulic fluid pressure passage having one end communicating with said shift valve and an opposite end communicating with the shifting friction element;

said shift valve having a position where said outlet thereof is connected to said inlet thereof to allow supply of said actuating hydraulic fluid pressure to the shifting friction element via said hydraulic fluid pressure passage;

a control unit including means for generating a first shift signal indicating that the transmission is to shift to the one of the plurality of speed ratios and a second shift signal indicating that the transmission is to shift to the another one of the plurality of speed ratios; and an electro-hydraulic transducer provided at said hydraulic fluid pressure passage for modulating the characteristic of hydraulic fluid pressure supplied to the predetermined friction element in different patterns selected in response to said first shift signal and second shift signal.

According to another embodiment of the present invention, there is provided a hydraulic control system for an automatic transmission for an automotive vehicle having an engine, the transmission having a plurality of friction elements including a predetermined friction element, the transmission being shiftable upto a predetermined one of a plurality of speed ratios by hydraulically engaging the predetermined friction element, and the transmission being shiftable down to said predetermined one speed ratio by hydraulically engaging the predetermined friction element, said hydraulic control system comprising:

a source of actuating hydraulic fluid pressure;

a shift valve communicating with said source of actuating hydraulic fluid pressure;

a shift valve having an inlet communicating with said source of actuating hydraulic fluid pressure and an outlet;

means for defining a hydraulic fluid pressure passage having one end communicating with said shift valve and an opposite end communicating with the shifting friction element;

said shift valve having a position where said outlet thereof is connected to said inlet thereof to allow supply of said actuating hydraulic fluid pressure to the shifting friction element via said hydraulic fluid pressure passage;

a control unit including means for generating a first shift signal indicating that the transmission is to shift upto said predetermined speed ratio and a second shift signal indicating that the transmission is to shift down to said predetermined speed ratio; and an electro-hydraulic transducer provided at said hydraulic fluid pressure passage for modulating the characteristic of hydraulic fluid pressure supplied to the predetermined friction element in different patterns selected in response to said first shift signal and second shift signal.

DESCRIPTION OF THE EMBODIMENTS

Before entering into the detail discussion of the first embodiment in reference to FIG. 3, the automatic transmission incorporating the first embodiment is generally described hereinafter in connection with FIGS. 1 and 2.

Figure 1:
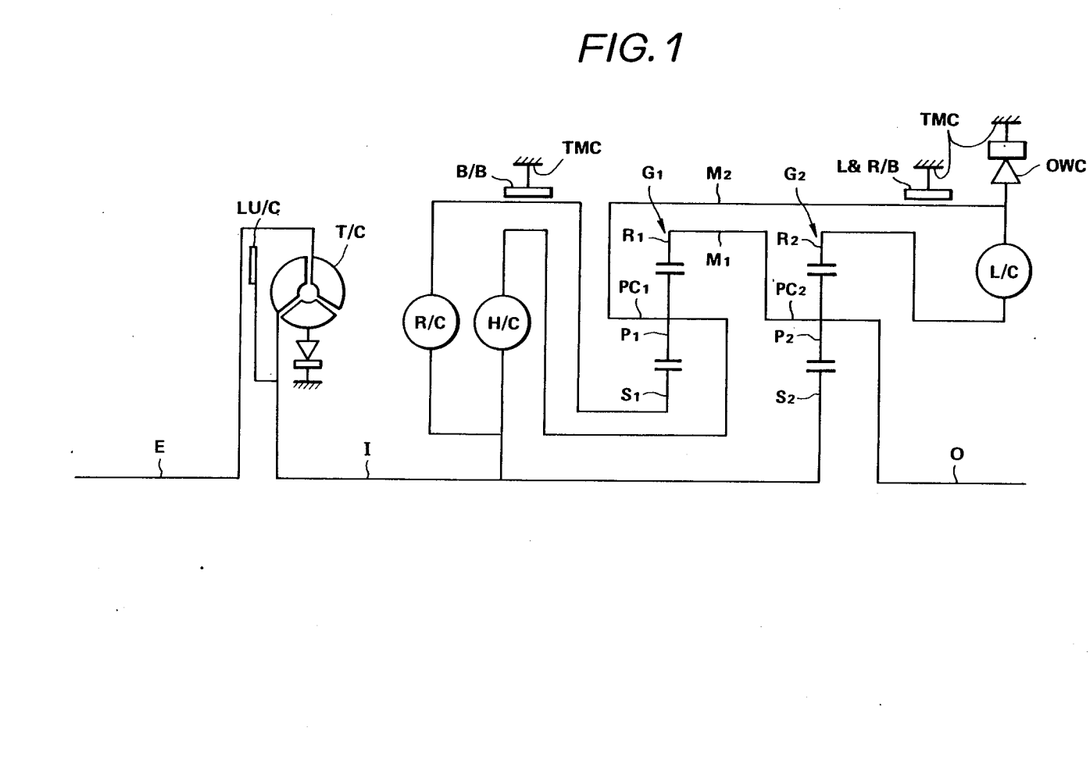
FIG. 1 is a schematic view of a power train of an automatic transmission.

FIG. 1 shows an engine crankshaft E, a torque converter T/C, a lock-up clutch LU/C, a transmission input shaft I, a front planetary gearset G1, a first connecting member M1, a second connecting member M2, a rear planetary gearset G2, a transmission output shaft O, a reverse clutch R/C, a high clutch H/C, a low clutch L/C, a low & reverse brake L&R/B, a band brake B/B, and a one-way clutch OWC.

The front planetary gearset G1 and rear planetary gearset G2 are simple planetary gearset. The front planetary gearset G1 comprises a front sun gear S1, a front ring gear R1, and a front planet carrier PC1 rotatably supporting front pinion gears P1 each meshing with both the sun gear S1 and ring gear R1. The rear planetary gearset G2 comprises a rear sun gear S2, a rear ring gear R2, and a rear planet carrier PC2 rotatably supporting a plurality of rear pinion gears P2 each meshing with the sun gear S2 and ring gear R2.

The first connecting member M1 serves to connect the front ring gear R1 to rear planet carrier PC2. The second connecting member M2 serves to connect the front planet carrier PC1 to rear ring gear R2 via engagement of the low clutch L/C.

The reverse clutch R/C, high clutch H/C, low clutch L/C, low & reverse brake L&R/B, band brake B/B, and one-way clutch OWC are shifting friction elements which are selectively put into operation in accordance with a predetermined pattern to establish various speed ratios.

The reverse clutch R/C, when engaged, connects the input shaft I to the front sun gear S1.

The high clutch H/C, when engaged, connects the input shaft I to the front planet carrier PC1.

The low clutch L/C, when engaged, connects the front planet carrier PC1 to the rear ring gear R2.

The low & reverse brake L&R/B, when applied, holds the front planet carrier PC1 stationary relative to the transmission case TMC.

The band brake B/B, when applied, holds the front sun gear S1 stationary relative to the transmission case TMC.

The one-way clutch OWC prevents reverse rotation of the front planet carrier PC1 although it allows forward rotation of the same (i.e., the same rotational direction in which the engine rotates).

The band brake B/B is activated or applied if hydraulic fluid pressure is supplied to an apply side of a band servo 17 and holds the front sun gear S1 stationary relatiove to the transmission case TMC.

The following TABLE 1 shows the pattern in accordance of which the above mentioned friction elements are selectively put into operation.

TABLE 1

|   |      | R/C | H/C | L/C | B/B S/A | B/B S/R | L&R/B | OWC |
|---|------|-----|-----|-----|---------|---------|-------|-----|
|   | P    |     |     |     |         |         |       |     |
|   | R    | o   |     |     |         |         | o     |     |
|   | N    |     |     |     |         |         |       |     |
| D | 1st. |     |     | o   |         |         |       | o   |
|   | 2nd. |     |     | o   | o       |         |       |     |
|   | 3rd. |     | o   | o   | o       | o       |       |     |
|   | 4th. |     | o   | o   |         |         |       |     |
| II| 1st. |     |     | o   |         |         |       | o   |
|   | 2nd. |     |     | o   | o       |         |       |     |
|   | 3rd. |     | o   | o   | o       | o       |       |     |
| I | 1st. |     |     | o   |         |         | o     | o   |

TABLE 1-continued

|  | R/C | H/C | L/C | B/B | | L&R/ | OWC |
|---|---|---|---|---|---|---|---|
|  |  |  |  | S/A | S/R | B |  |
| 2nd. |  |  |  | o | o |  |  |

In the TABLE 1, the sign "o" indicates the state where the particular shifting friction element is pressurized. Referring to the TABLE 1, both the servo apply side (i.e., a servo apply chamber S/A) and the servo release side (i.e., a servo release chamber S/R) are pressurized during D range third speed ratio and II range third speed ratio. In this state, the band brake B/B is activated or applied owing to the difference in the pressure acting areas of the opposite ends of the servo piston.

Figure 2A:
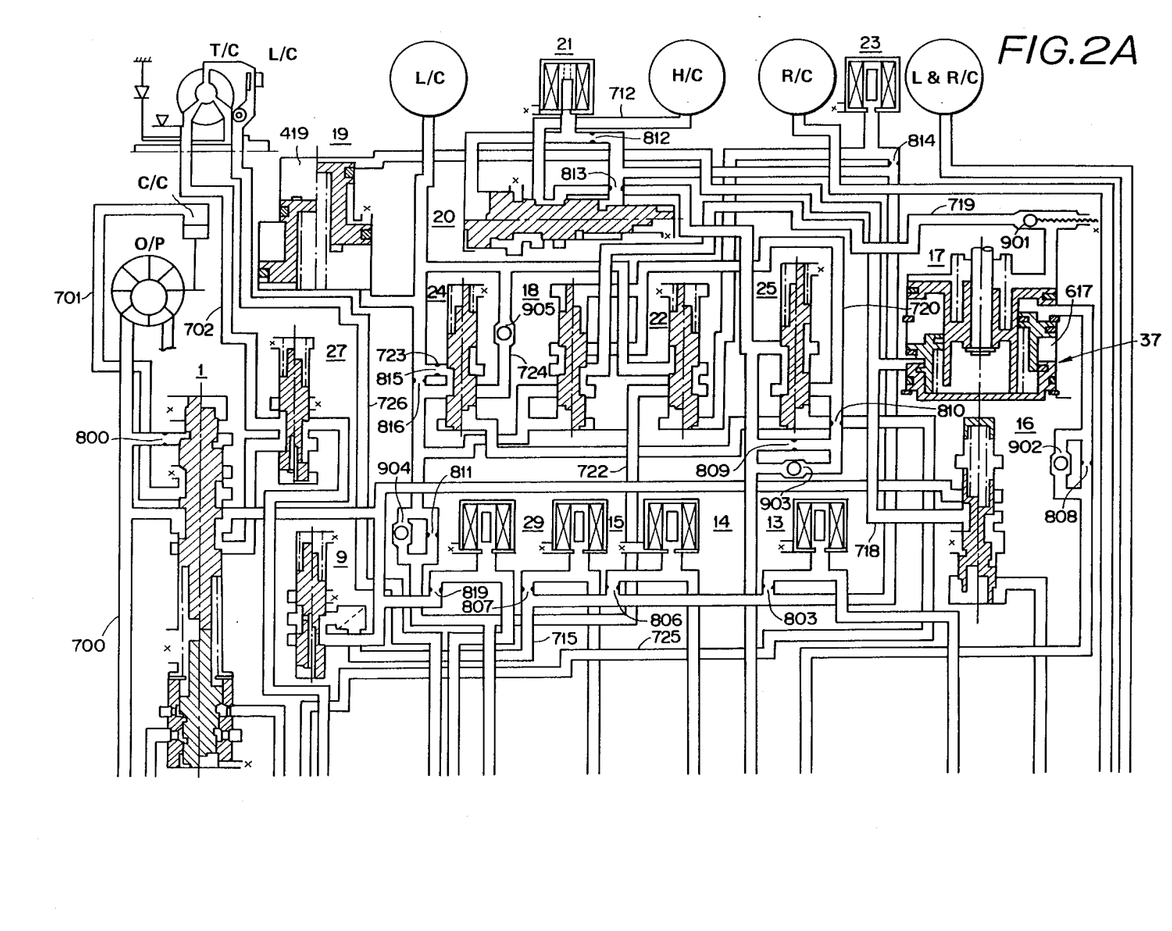
FIGS. 2A and 2B show a hydraulic circuit of a first embodiment of a hydraulic control system for the automatic transmission.
Figure 2B:
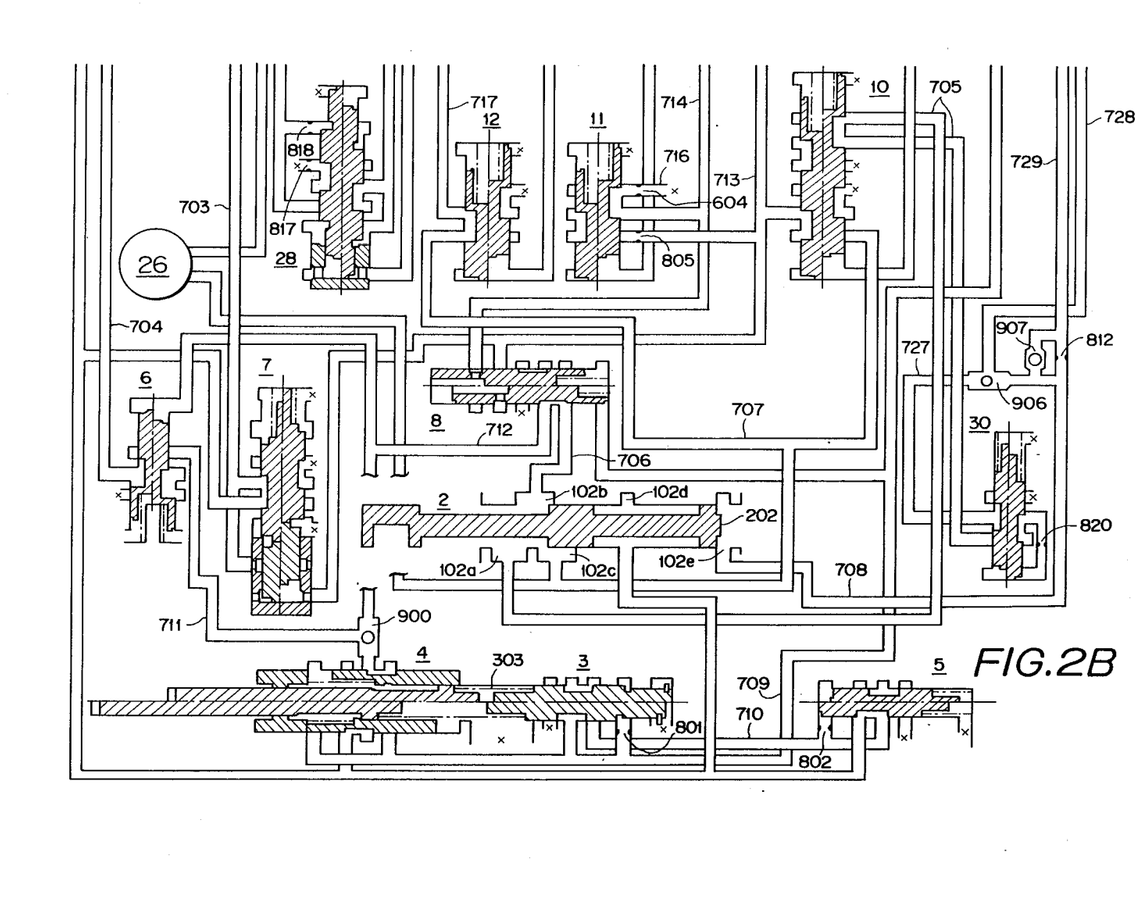

Referring to FIG. 2, the hydraulic control system is hereinafter described. This hydraulic control system features in electronic control of activation of shift valves and in implementation of electronic control in a clutch control valve or a clutch timing control valve in order to alleviate shift shock.

FIG. 2 shows an oil pump O/P, a pressure regulator valve 1, a throttle valve 3, a detent & fail-safe valve 4, a kickdown modulator valve 5, a pressure modifier valve 6, a pilot valve 9, a 1-2 shift valve 10, a 2-3 shift valve 11, a 3-4 shift valve, 1-2 solenoid valve 13, a 2-3 solenoid valve 14, a 3-4 solenoid valve 15, an accumulator valve 16, a band servo 17, a servo release timing valve 18, a low clutch accumulator 19, a high clutch control valve 20, a high clutch solenoid valve 21, a low clutch timing valve 22, a low clutch solenoid valve 23, a 4-3 timing valve 24, a 3-2 timing valve 25, a governor valve 26, a torque converter regulator valve 27, a lock-up valve 28, a lock-up solenoid valve 29, a I range reducing valve 30. These valves are circuited by hydraulic fluid passages 700 to 729 as illustrated.

The oil pump O/P is a variable volume type vane pump which has a hydraulic fluid pressure chamber C/C of a control cylinder connected to the hydraulic fluid passage 701 that serves as a feedback fluid pressure passage such that the pump discharge amount keeps a predetermined value at revolution speeds above a predetermined value.

The pressure regulator valve 1 is operable to adjust pressurized hydraulic fluid pressure discharged from the oil pump O/P to an appropriate pressure level for the running state and speed ratio established in the transmission.

The manual valve 2 is operated by a select lever manipulated by a driver and selects port or ports to which line pressure is to be distributed.

Manipulating the selector lever causes a spool 202 to move between P range, R range, N range, D range, II range, and I range. Ports to be supplied with the line pressure are shown in the following TABLE 2.

TABLE 2

| RANGE | PORT | | | | |
|---|---|---|---|---|---|
|  | 102a | 102b | 102c | 102d | 102e |
| P |  |  |  |  |  |
| R |  |  |  | o | o |
| N |  |  |  | o |  |
| D |  |  | o | o |  |
| II |  | o | o | o |  |
| I | o | o | o | o |  |

In the TABLE 2, the port labelled with the sign "o" is supplied with the line pressure, whereas the port not labelled is drained.

The throttle valve 4 is operable to adjust the line pressure to a pressure variable corresponding to throttle opening degree (i.e., throttle pressure).

The detent & fail-safe valve 4 is locked to an accelerator pedal linkage such that it applies a change in throttle opening degree to the throttle valve 3 via a spring 303. It has a detent function to supply throttle pressure to the pressure modifier valve 6, and a fail-safe function to supply line pressure to the pressure modifier valve 6 if the accelerator linkage is broken to cause the pressure regulator valve to produce the line pressure of the maximum value.

The kickdown modulator valve 5 is operative to generate a kickdown modulator pressure to be supplied to the throttle pressure 3 as a base pressure for generating throttle pressure.

The pressure modifier valve 6 is operative to generate a throttle modifier pressure to be supplied to the pressure regulator valve 1 as a signal pressure indicative of the variation characteristic of the engine torque.

The cutback valve 7 is operative to generate a cutback pressure to be supplied to the pressure regulator valve 1 so that the line pressure of increased magnitude is produced during D range first speed ratio, II range first speed ratio, I range first speed ratio, R range, P range and N range.

The backup valve 8 has a backup function to increase the magnitude of line pressure in order to increase the gripping force with which the band brake B/B is applied for producing increased effective engine brake running in the case where II range second speed ratio or I range second speed ratio is selected from D range third speed ratio or D range fourth speed ratio with the intention to effect engine brake running. It also has a function to release the backup function of increasing the magnitude of line pressure after the accelerator pedal has been depressed deeply during engine brake running.

The pilot valve 9 is operative to generate a pilot pressure which is supplied, as an actuating fluid pressure, to the 1-2 shift valve 10, 2-3 shift valve 11, 3-4 shift valve 12, low clutch timing valve 22 and high clutch control valve 20 although this pilot pressure may be modulated by the corresponding solenoid valves before being supplied to the valves.

The 1-2 shift valve 10, 2-3 shift valve 11 and 3-4 shift valve 12 are shiftable by the 1-2 shift solenoid valve 13, 2-3 shift solenoid valve 14 and 3-4 shift solenoid valve 15, respectively. Each of the shift solenoid valves 13, 14 and 15 is operable on an ON/OFF type control signal. The control signals supplied to the shift solenoid valves in each of the speed ratios are shown in the following TABLE 3.

TABLE 3

|  | 1-2 SOL. | 2-3 SOL. | 3-4 SOL. |
|---|---|---|---|
| 1st. | ON | ON | OFF |
| 2nd. | OFF | ON | OFF |
| 3rd. | OFF | OFF | OFF |
| 4th. | OFF | OFF | ON |

As will be understood from the TABLE 3, the third speed ratio is established if all of the shift solenoid valves turned OFF due to the occurrence of a trouble in electrical connection in control system.

The accumulator valve 16 is operative on throttle pressure as a signal pressure to decrease the line pressure supplied to an accumulator chamber 617 of the band servo 17 in order to alleviate shift shock upon application of the band brake B/B. The reduced line pressure by the accumulator valve 16 is supplied also to an accumulator chamber 419 of the low clutch accumulator 19 in order to alleviate shift shocks upon engagement of the low clutch L/C.

The band servo 17, including a band servo accumulator 37, serves as a hydraulic actuator for applying or releasing the band brake B/B.

The servo release timing valve 18 is operative to connect the hydraulic fluid passage 719 connected to the servo release side of the band servo 17 to the hydraulic fluid passage 720 connected to the high clutch H/C or the hydraulic fluid passage connected to the low clutch L/C, selectively, in effecting shift-up or shift-down between the second speed ratio, third speed ratio and fourth speed ratio.

The low clutch accumulator 19 is operative to moderate the rising of actuating fluid pressure supplied to the low clutch L/C in order to provide a smooth shift operation.

The high clutch control valve 20 is operative on an electrical control signal supplied to a high clutch solenoid valve 21 and controls the rising of actuating hydraulic fluid pressure supplied to the high clutch H/C, the pressure level of the actuating hydraulic fluid pressure, and the supply timing of the actuating hydraulic fluid pressure.

The high clutch solenoid valve 21 is operable on the control signal supplied thereto by a control unit, not illustrated.

The low clutch timing valve 22 is operative on an electrical control signal supplied to a low clutch solenoid valave 23 and establishes a hydraulic fluid passage bypassing an orifice 811 during the final stage of shift operation in effecting a shift down from the fourth speed ratio to the third speed ratio involving engagement of the low clutch L/C.

The low clutch solenoid valve 23 is operative on the control signal supplied thereto by the control unit not illustrated.

The 4–3 timing valve 24 is operative to provide quick rising of the low clutch actuating hydraulic fluid pressure in effecting a shift down from D range fourth speed ratio to D range third speed ratio at low vehicle speeds, but it provides slow rising of the low clutch actuating hydraulic fluid pressure in effecting the shift down from D range fourth speed ratio to D range third speed ratio at high vehicle speeds.

The 3–2 timing valve 25 is operative to effect quick drainage of hydraulic fluid to decrease servo release pressure that serves as a band release pressure for the band servo 17 at low vehicle speeds in effecting a shift down from the third speed ratio to the second speed ratio, but it provides slow drainage of hydraulic fluid from the servo release side of the band servo 17 at high vehicle speeds.

The governor valve 26 is operative in response to rotation of the transmission output shaft to generate a governor pressure variable with the vehicle speed.

The torque converter regulator valve 27 is operative to prevent excessive increase of torque converter pressure supplied to the torque converter T/C.

The lock-up valve 28 is operative on an electrical control signal supplied to the lock-up solenoid valve 29 to control engagement or release of the lock-up clutch LU/C.

The lock-up solenoid valve 29 is operative on the control signal supplied thereto by the control unit not illustrated.

The I range reducing valve 30 is operative to reduce the actuating hydraulic fluid pressure supplied to the low & reverse brake L & R/B in order to alleviate engine brake shock in effecting a shift to I range.

The hydraulic fluid passages are labelled as follows:
700 . . . line pressure passage,
701 . . . feedback pressure passage,
702 . . . torque converter pressure passage,
703 . . . cutback pressure passage,
704 . . . throttle modifier pressure passage,
705 . . . I range pressure passage,
706 . . . II range pressure passage,
707 . . . D range pressure passage,
708 . . . R range pressure passage,
709 . . . throttle pressure passage,
710 . . . kickdown modulator pressure passage,
711 . . . throttle or line pressure passage,
712 . . . backup pressure passage,
713 . . . 2nd, 3rd, and 4th speed ratio pressure passage,
714 . . . 3rd and 4th speed ratio pressure passage,
715 . . . pilot pressure passage,
716 . . . 2nd speed ratio drain passage,
717 . . . low clutch pressure passage,
718 . . . accumulator pressure passage,
719 . . . servo release pressure passage,
720 . . . 3rd, 4th speed ratio branch passage,
721 . . . high clutch pressure passage,
722 . . . low clutch pressure first bypass passage,
723 . . . low clutch pressure second bypass passage,
724 . . . low clutch pressure drain bypass passage,
725 . . . governor pressure passage,
726 . . . lock-up clutch pressure passage,
727 . . . low & reverse brake reduced pressure passage,
728 . . . low & reverse pressure passage,
729 . . . reverse clutch pressure passage, The reference numerals 800 to 821 designate orifices, respectively. The reference numerals 900 and 906 designate shuttle balls, respectively. The reference numerals 901 to 905 and 907 designate one-way balls, respectively.

Figure 3:
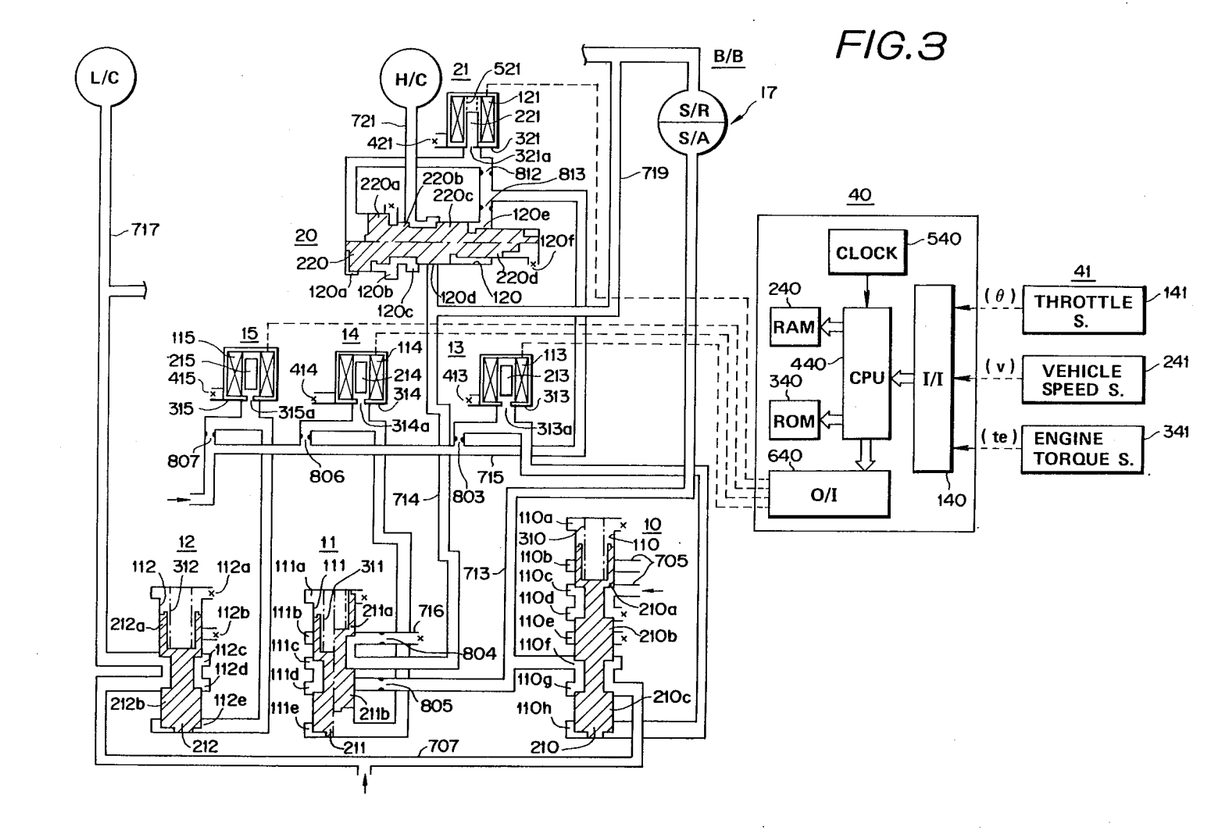
FIG. 3 is a fragmentary view of FIG. 2 and illustrates the first embodiment in detail.

Referring to FIG. 3, the first embodiment is described in detail.

FIG. 3 shows the high clutch control valve 20 operative on electric signal from the control unit, which serves as means for modulating the characteristic of the actuating hydraulic fluid pressure supplied to the high clutch H/C. It also shows the 1–2 shift valve 10, 2–3 shift valve 11, 3–4 shift valve 12, 1–2 solenoid valve 13, 2–3 solenoid valve 14, 3–4 solenoid valve 15, band servo 17, high clutch control valve 20, high clutch solenoid 21, a control unit 40, and a family 41 of input sensors.

The 1–2 shift valve 10 includes a valve bore 110 formed with ports 110a to 110h, a spool 210 formed with lands 210a, 210b, 210c that correspond to the valve bore 110, and a spring 310 biasing the spool 210 downwards as viewed in FIG. 3.

The ports 110a, 110b and 110e are drain ports, respectively. The ports 110a and 110b are connected to the I range pressure passage 705. The port 110f is connected to the 2nd, 3rd, and 4th speed ratio passage 713. The port 110g is connected to the D range pressure passage 707. The port 110h is connected to the pilot pressure passage 715 via the orifice 803.

If a 1–2 shift control signal (i.e., an OFF signal) is supplied to the 1–2 solenoid valve 13, the 1–2 solenoid valve 13 assumes an open position thereof. Thus, the pilot pressure having been supplied from the pilot pressure passage 715 to the port 110h of the 1–2 shift valve 10 is removed via the drain port 413, allowing the spool 210 to be pressed downwards due to the spring force of the spring 310. This downward movement of the spool 210 causes the ports 110f and 110g to open their communication, allowing the supply of the D range pressure from the D range pressure passsage 707 to the 2nd, 3rd and 4th speed ratio passage 713.

If a 2–1 shift control signal (i.e., an ON signal) is supplied to the 1–2 solenoid valve 13, the 1–2 solenoid valve 13 assume a closed position thereof. Thus, the pilot pressure is supplied to the port 110h, urging the spool 210 upwards against the spring 310. This upward movement of the spool 210 causes the port 110f to communicate with the drain port 110e, draining the hydraulic fluid from the 2nd, 3rd and 4th speed ratio passage 713 via the drain port 110e.

The 2–3 shift valve 11 includes a valve bore 111 formed with ports 111a to 111e, a spool 211 formed with lands 211a and 211b corresponding to the valve bore 111, and a spring 311 biasing the spool 211 downwards, as viewed in FIG. 3.

The ports 111a and 111b are drain ports, respectively. The port 111b is connected to the 2nd speed ratio drain passage 716 provided with the orifice 804. The port 111v is connected to the 3rd and 4th speed ratio passage 714. The port 111d is connected to the 2nd, 3rd and 4th speed ratio pressure passage 713 provided with the orifice 805. The port 111e is connected to the pilot pressure passage 715 provided with the orifice 806.

If a 2–3 shift control signal (i.e., an OFF signal) is supplied to the 2–3 solenoid valve 14, the 2–3 solenoid valve 14 assumes an open position thereof. Thus, the pilot pressure having been supplied from the pilot pressure passage 715 to the port 111e of the 2–3 shift valve 11 is removed via the drain port 414, allowing the spool 211 to be pressed downwards due to the spring force of the spring 311. This downward movement of the spool 211 causes the ports 111c and 111d which has been interrupted to open their communication, allowing the supply of hydraulic fluid pressure from the 2nd, 3rd amd 4th speed ratio pressure passage 713 to the 3rd and the 4th speed ratio pressure passage 714 via the orifice 805. It also causes the ports 111b and 111c which have been communicated with each other to interrupt their communication.

If a 3–2 shift control signal (i.e., an ON signal) is supplied to the 2–3 solenoid valve 14, the 2–3 solenoid valve 14 assumes a close position thereof. Thus, the pilot pressure is supplied to the port 111e, urging the spool 211 upwards against the spring 311. This upward movement of the spool 211 causes the ports 111c and 111d to interrupt their communication and the ports 111b and 111c to open their communication, draining the hydraulic fluid from the 3rd and 4th speed ratio pressure passage 714.

The 3–4 shift valve 12 includes a valve bore 112 formed with ports 112a to 112e, a spool 212 formed with lands 212a, 212b, 212c that correspond to the valve bore 112, and a spring 312 biasing the spool 212 downwards as viewed in FIG. 3.

The ports 112a and 112b are drain ports, respectively. The port 112c is connected to the low clutch pressure passage 717. The port 112d is connected to the D range pressure passage 707. The port 112e is connected to the pilot pressure passage 715 provided with the orifice 807.

If a 3–4 shift control signal (i.e., an ON signal) is supplied to the 3–4 solenoid valve 15, the 3–4 solenoid valve 15 assumes a close position thereof, allowing the pilot pressure to be supplied from the pilot pressure passage 715 to the port 112e of the 3–4 shift valve, urging the spool 212 upwards against the force of the spring 312. This upward movement of the spool 212 causes the ports 112c and 112d which have communicated with each other to interrupt their communication. It also causes the port 112c connected to the low clutch pressure passage 717 to communicate with drain port 112b.

If a 4–3 shift control signal (i.e., an OFF signal) is supplied to the 3–4 solenoid valve 15, the 3–4 solenoid valve 15 assumes an open position thereof. Thus, the pilot pressure having been supplied to the port 112e is removed via the drain port 415, allowing the spool 212 to be pressed downwards by the spring 312 where the ports 112c and 112b are interrupted and the port 112c communicates with the port 112d.

The 1–2 solenoid valve 13, 2–3 solenoid valve 14 and 3–4 solenoid valve 15 have the same structure and comprise solenoids 113, 114, 115, respectively, valve members 213, 214, 215, respectively, valve seats 313, 313, 315, respectively, which are formed with ports 313a, 314a, 315a, respectively, and drain ports 413, 414, 415, respectively.

The solenoid valves operate such that if ON signals are supplied to the solenoids 113, 114, 115, the valve members 213, 214, 215 seat on the valve seats 313, 314, 315 to close the ports 313a, 314a, 315a, causing the pilot pressure to be supplied to the corresponding shift valves, respectively.

If the OFF signals are supplied to the solenoids 113, 114, 115, the valve members 213, 214, 215 disengage from the valve seats 313, 314, 315, allowing the pilot pressure having been supplied to the corresponding shift valves to be removed via the corresponding drain ports 413, 414, 415, respectively.

The band servo 17 is formed with a servo apply pressure chamber S/A and a servo release pressure chamber S/R on th opposite ends of the servo piston having attached thereto a piston stem for applying or releasing the band brake B/B. If the servo apply pressure chamber S/A only is pressurized, the band servo 17 applies the band brake B/B, while if both the servo apply pressure chamber S/A and servo release pressure chamber S/R are pressurized, the band servo 17 release the band brake B/B since the servo piston has a larger pressure acting area exposed to the servo release pressure chamber S/R.

The high clutch control valve 20 includes a valve bore 120 formed with ports 120a to 120f, and a spool 220 formed with lands 220a to 220d corresponding to the valve bore.

The land 220a is larger in diameter than the other land 220c. The port 120a is connected to the pilot pressure passage 715 provided with the orifice 812. The ports 120b and 120f are drain ports, respectively. The port 120c is connected to the high clutch pressure passage 721. The port 120d is connected to the 3rd and 4th speed pressure passage 714. The port 120e is connected to the pilot pressure passage 715 provided with the orifice 813.

If the control signal supplied to the high clutch solenoid valve 21 is an OFF signal, the high clutch solenoid valve 21 assumes a closed position thereof. In this closed position, the pilot pressure from the pilot pressure passage 715 is supplied to the ports 120a and 120e to act on the lands 220a and 220d. Since there is a difference in pressure acting area between these lands 220a and 220d, the spool 220 is shifted to a right position as illustrated by the upper half thereof as viewed in FIG. 3 where the port 120c is allowed to communicate with the port 120d, allowing the supply of hydraulic fluid from the 3rd and 4th fluid fluid passage 714 to the high clutch pressure passage 721. If the control signal supplied to the high clutch solenoid valve 21 is an ON signal, the high clutch solenoid valve 21 assumes an open position (i.e., a drain state). In this state, the pilot pressure is removed from the port 120a, and thus the spool 220 assumes a left position as illustrated by the lower half thereof as viewed in FIG. 3 where the port 120c is allowed to communicate with the drain port 120b and the communication between the 3rd and 4th speed ratio pressure passage 714 and the high clutch pressure passage 721.

The high clutch solenoid valve 21 is operative on the control signal supplied thereto from the control unit 40. It comprises a solenoid 121, a valve member 221, a valve seat 321 formed with a port 321a, a drain passage 421, and a spring 521 biasing the valve member 221 downwards as viewed in FIG. 3. The operation is such that if the control signal is an OFF signal, the valve member 221 closes the port 321a under the action of the spring 521, while if the control signal is an ON signal, the valve member 221 is attracted by the solenoid 121 away from the valve seat 321.

The control unit 40 uses a vehicle mounted microcomputer and includes an input circuit 140, a RAM (Ramdon Access Memory) 240, a ROM (Read Only Memory) 340, a CPU (Central Processing Unit) 440, a clock circuit 540, and an output circuit 640.

The input circuit 140 is a circuit which converts input signals to digital signals which can be processed by the CPU 440.

The output circuit 640 is a circuit which outputs control signals to the solenoids having duty factors determined based on result of computation within the CPU 440.

The input sensors generally designated by the reference numeral 41 include a throttle opening degree sensor 141, a vehicle speed sensor 241, and an engine torque sensor 341.

The throttle opening degree sensor 141 generates a throttle opening degree signal ($\theta$) variable with throttle opening degree of the engine.

The vehicle speed sensor 241 generates a vehicle speed signal (v). This vehicle speed signal (v) and throttle opening degree signal ($\theta$) are used as input signals based on which a shift command signal is generated and supplied to the solenoid valves 13, 14 and 15. A shift schedule table which contains speed ratios versus vehicle speed and throttle opening degree is stored in the ROM 340 for table lookup by the CPU 440 in processing shift control against vehicle speed signal (v) and throttle opening degree signal ($\theta$). The CPU 440 judges whether the current speed ratio is to be maintained based on comparison of the data within the shift schedule table with vehicle speed (v) and throttle opening degree signal ($\theta$) and generates a shift signal if a new speed ratio is demanded. Among various kinds of shift signals, a shift signal upto the third speed ratio and a shift signal upto the fourth speed ratio are used as a detect signal detecting an upshift in the process of controlling the high clutch control valve 20.

The engine torque sensor 341 generates an engine torque signal (te) variable with the engine torque Te. This sensor is used as an input sensor for setting actuating pressure characteristic control time in terms of timer value T determined based on vehicle speed V and engine torque Te.

Figure 4:
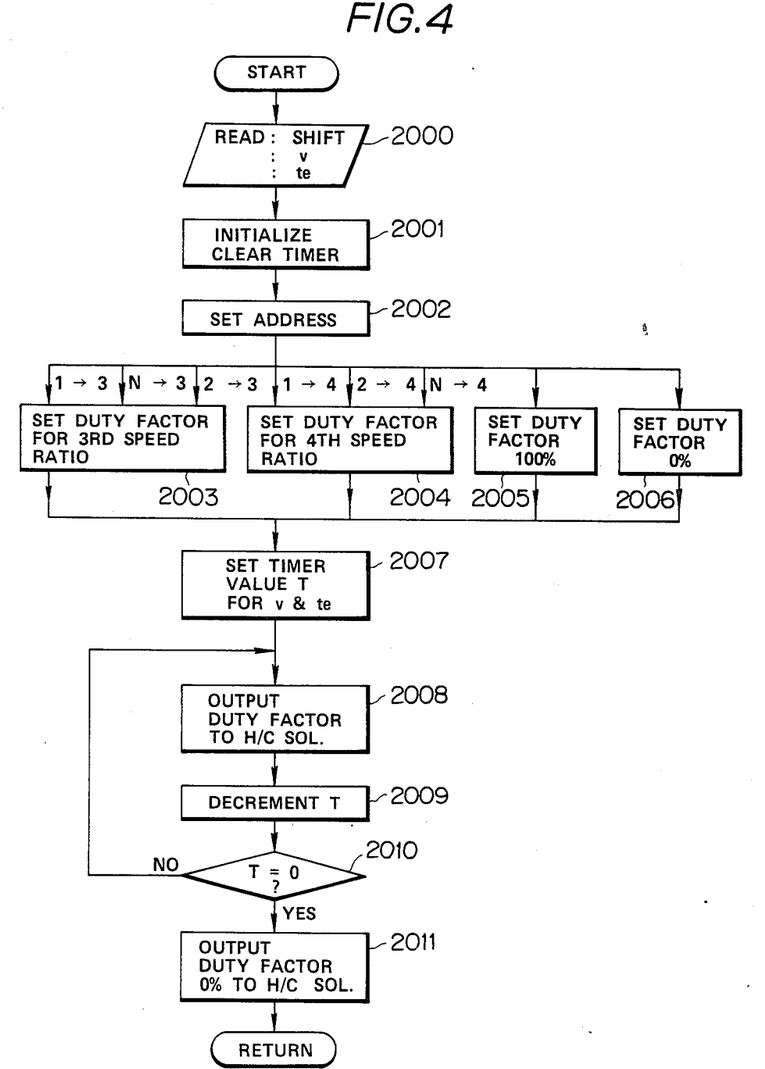
FIG. 4 is a flowchart.

The operation of the first embodiment is described hereinafter along with a flowchart shown in FIG. 4 illustrating flow of processing performed in the control unit 40 for the high clutch control valve 20.

The duty factor used for controlling the high clutch control valve 20 is set at one of steps 2003, 2004, 2005 and 2006 which is selected after the processing along steps 2000, 2001 and 2002.

Referring to the difference between torque capacity required for the high clutch H/C when engaged during the third speed ratio and that required for it when engaged during the fourth speed ratio, a larger torque capacity is required for engagement during the fourth speed ratio as compared to its engagement for the third speed ratio. Thus, taking the above difference into account, the clutch engagement hydraulic pressure for an upshift to the third speed ratio is made different from that for an upshift to the fourth speed ratio. In this embodiment, the upshift to the third speed ratio includes 1-3 shift, N-3 shift, and 2-3 shift, whereas the upshift to the fourth speed ratio includes 1-4 shift, 2-4 shift and N-4 shift. On occurrence of the upshift to the third speed ratio, a duty factor suitable for the torque capacity required for its engagement during the third speed ratio is set at step 2003. On occurrence of the upshift to the fourth speed ratio, a duty factor suitable for the torque capacity required for its engagement during the fourth speed ratio is set at step 2004. On occurrence of any downshift from the third speed ratio or the fourth speed ratio, a duty factor is set as 100% at step 2005. When the duty factor is equal to 100%, the hydraulic fluid is drained from the high clutch H/C via the drain port 120b. On occurrence of the other kinds of shift, a duty factor is set as 0% at step 2006. When the duty factor is equal to 0%, the port 120c is allowed to communicate with the port 120d.

At step 2000, various kinds of input information necessary for duty factor control of the high clutch control valve 20 are read. At step 2001, the environment is adjusted to the required starting configuration. At step 2002, the content of shift is determined based on the shift command signal and among addresses where different duty factors are disposed an address suitable for the content of shift is selected and set.

After the suitable duty factor has been set at one of the steps 2003, 2004, 2005 and 2006, the CPU 440 proceeds along step 2007, 2008, 2009 and 2010, and thereafter repeats an interrupt routine consisting of steps 2008, 2009 and 2010 until the timer value T becomes zero in order to output a train of ON/OFF duty signal having the duty factor previously set to the high clutch solenoid valve 21 during a period set by the timer value T. After the timer value T has become zero, the CPU proceeds to step 2011 where a duty signal having the duty factor equal to 0% is output to the high clutch solenoid valve 21.

At step 2007, the timer value T is set as a suitable value for vehicle speed signal (v) and engine torque signal (te). More specifically, various timer values T, each suitable for a set of vehicle speed value and engine torque value, are stored in the ROM 340 in a two-dimensional map, and thus suitable timer value T is set by performing a table lookup of this two-dimensional table based on the vehicle speed V and the engine torque Te indicated by vehicle speed signal (v) and engine torque signal (te), respectively. At step 2009, the timer value T is decreased by a predetermined value upon completion of execution of the interrupt routine. At step 2010, a decision is made whether or not the timer value T is equal to zero. For example, if the number of count of the timer value is 50 and the number of count of the predetermined value is 10, the step 2011 is executed when the timer value T becomes zero after the execution of the interrupt routine is repeated 5 times.

In order to deal with the difference in torque capacity required between the case where the high clutch H/C is engaged at third speed ratio and the case where it is engaged at fourth speed ratio, the clutch engagement pressure to be supplied to the high clutch H/C is set to optimum characteristic in accordance with torque capacity required by activating the high clutch control valve with the duty control in the above mentioned manner, thus alleviating shift shock occurring not only at third speed ratio but also at fourth speed ratio.

Figure 5:
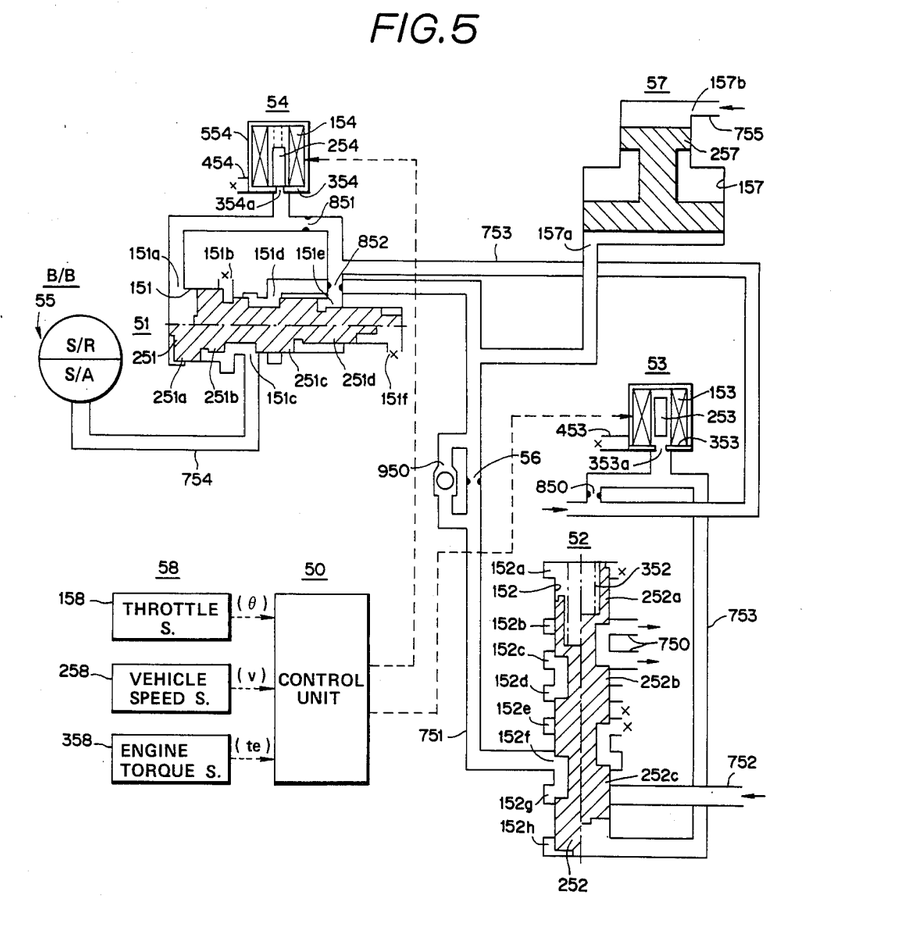
FIG. 5 is a similar view to FIG. 3 and illustrates a second embodiment.

Second embodiment shown in FIG. 5 is described.

The second embodiment features the provision of a servo apply control valve 51 in the fluid pressure passage between a 1-2 shift valve 52 and a servo apply chamber S/A of a band servo 55 for a band brake B/B (see FIG. 1 also). FIG. 5 also shows 1-2 solenoid valve 53, a servo apply solenoid valve 54, an orifice 56, a band servo accumulator 57, a control unit 50 and a family of input sensors 58. The automatic transmission which the second embodiment is applied to has the same power train as shown in FIG. 1.

The 1-2 shift valve 52 includes a valve bore 152 formed with ports 152a to 152h, a spool 252 formed with lands 252a, 252b, 252c corresponding to the valve bore 152, and a spring 352 biasing the spool 252 downwards as viewed in FIG. 5.

The ports 152a, 152d, 152e are drain ports, respectively. The ports 152b and 152c are connected to a I range pressure passage 750. The port 152f is connected to a 2nd, 3rd, and 4th speed ratio pressure passage 751. The port 152g is connected to a D range pressure passage 752. The port 152h is connected to a pilot pressure passage 753 provided with an orifice 850. Operation of this 1-2 shift valve 52 is the same as that of the 1-2 shift valve 10 used in the previously described first embodiment. Thus, further description of the 1-2 shift valve 52 is omitted.

The 1-2 solenoid valve 53 includes a solenoid 153, a valve member 253, a valve seat 353 formed with a port 353a, and a drain passage 453. The port 353a is connected to the pilot pressure passage 753. Operation of this 1-2 solenoid valve 53 is the same as that of the 1-2 solenoid valve 13 used in the first embodiment. Thus, further description of the 1-2 solenoid valve 53 is omitted.

The servo apply control valve 51 includes a valve bore 151 formed with ports 151a to 151f, and a spool formed with lands 251a to 251d corresponding to the valve bore 151. The land 251a is larger in diameter than the land 251c. The port 151a is connected to the pilot pressure chamber 753 via an orifice 851. The ports 151b and 151f are drain ports, respectively. The port 151c is connected to a servo apply passage 754. The port 151d is connected to a 3rd and 4th speed ratio pressure passage 751. The port 151e is connected to the pilot pressure passage via an orifice 852. Operation of this servo apply control valve 51 is the same as that of the high clutch control valve 20. Thus, further description of the operation is omitted.

The servo apply solenoid valve 54 is operative on a control signal from the control unit 50. It includes a solenoid 154, a valve member 254, a valve seat 354 formed with a port 354a, a drain passage 454, and a spring 554 biasing the valve member 254 downwards as viewed in FIG. 5.

If, in operation, the control signal is an OFF signal, the valve member 254 closes the port 354a under the action of the spring 554. If the control signal is an ON signal, the valve member 254 is attracted by the solenoid 154 and disengaged from the valve seat 354.

The band servo 55 is formed with a servo apply pressure chamber S/A and a servo release pressure chamber S/R on the opposite ends of a servo piston operatively connected to the band brake B/B (see FIG. 1) for applying or releasing the same. If the servo apply pressure chamber S/A only is pressurized, the band brake B/B is applied, while if both the servo apply pressure chamber S/A and servo release pressure chamber S/R are pressurized, the band brake B/B is released since the servo piston has a larger pressure acting area exposed to the servo release pressure chamber S/R.

The orifice 56 which is disposed in parallel to one-way ball 950 is provided to restrict fluid flow through the 2nd, 3rd, and 4th speed ratio pressure passage 751 in order to alleviate shift shock.

The band servo accumulator 57 includes a cylindrical bore 157 formed with ports 157a and 157b, and an accemulator piston 257 slidably disposed in the cylindrical bore 157. The port 157a is connected to the 2nd, 3rd, and 4th speed ratio pressure passage 751, and the port 157b is connected to the line pressure passage 755.

The control unit 50 is the same in construction to the control unit 40 used in the first embodiment. Thus detailed description of the control unit 50 is omitted. The input sensors 51 include similarly to the first embodiment a throttle opening degree sensor 158, a vehicle speed sensor 258 and an engine torque sensor 358.

Figure 6:
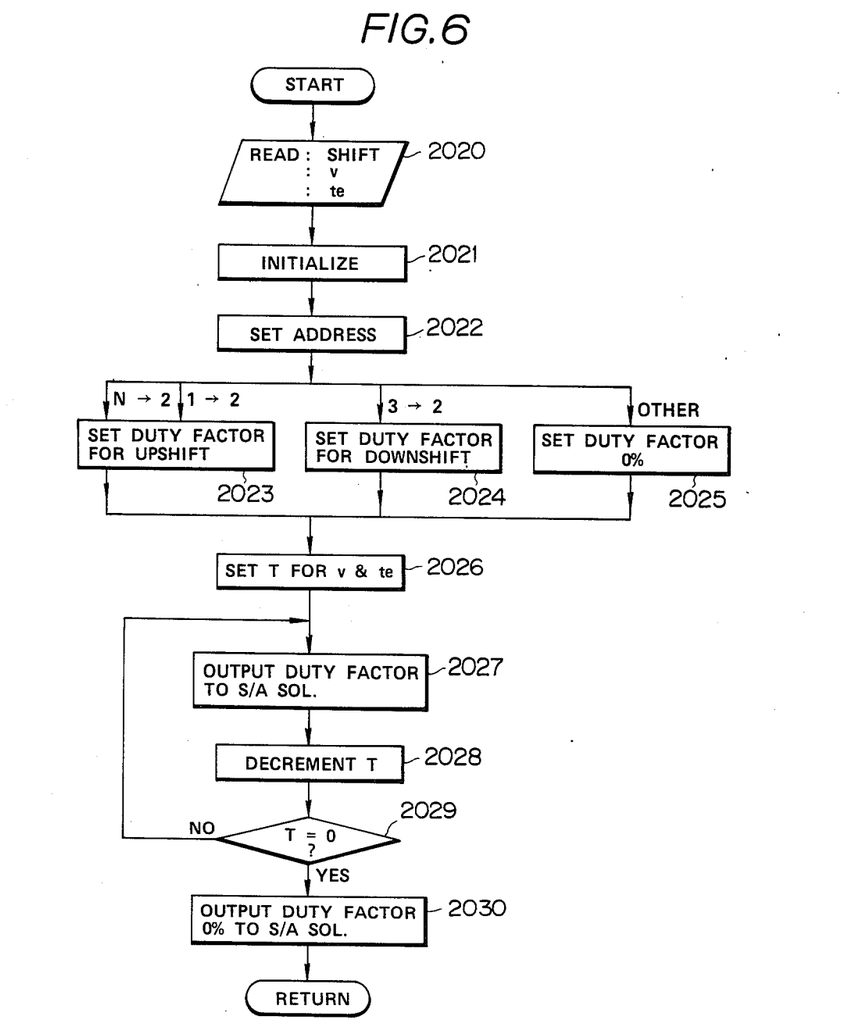
FIG. 6 is a flowchart.

The operation of the second embodiment is described hereinafter along with a flowchart shown in FIG. 6 illustrating the flow of processing performed in the control unit 50 for the servo apply control control valve 51.

The duty factor used for controlling the servo apply control valve 51 is set at one of steps 2023, 2024, and 2025 which is selected after the processing along steps 2020, 2021 and 2022.

There is a difference between torque capacity required for the band brake B/B when applied during at an upshift to the second speed ratio and that required for it when applied at a downshift to the second speed ratio. Thus, taking the above difference into account, the brake application hydraulic pressure for an upshift to the second speed ratio is made different from that for a downshift to the second speed ratio. In this embodiment, the upshift to the second speed ratio includes N-2 shift, and 1-2 shift, whereas the downshift to the second speed ratio includes 3-2 shift. On occurrence of the upshift to the second speed ratio, at step 2023 a duty factor is set whereby there is provided torque which is the sum of the engine torque Te and torque required to bring down the engine speed to the level for the second speed ratio engine torque Te. On occurrence of the downshift to the second speed ratio, at step 2024 another duty factor is set whereby there is provided torque which results from decreasing the engine torque Te by a torque portion which becomes excessive due to an increase in engine speed. On occurrence of the other kinds of shift, a duty factor is set equal to 0% at step 2025.

After the suitable duty factor is set at one of the steps 2023, 2024, and 2025, the control proceeds along step 2026, 2027, 2028 and 2029, and thereafter repeats an interrupt routine consisting of steps 2027, 2028 and 2029 until the timer value T becomes zero in order to output a train of ON/OFF duty signal having the duty factor previously set to the servo apply solenoid valve 54 during a period set by the timer value T. After the timer value T has become zero, the control proceeds to step 2030 where a duty signal having the duty factor equal to 0% is output to the servo apply solenoid valve 54.

Operation at each of the various steps excluding the three steps 2023, 2024 and 2025 is similar to its counterpart in the previously described first embodiment.

In order to deal with the difference in torque capacity required between the case where the band brake B/B is applied at upshift when the engine speed is decreasing and the case where it is applied at downshift when the engine speed is increasing, the brake application pressure to be supplied to the band brake B/B is set to optimum characteristic in accordance with torque capacity required by activating the servo apply control valve 54 with the duty control in the above mentioned manner, thus alleviating shift shock occurring not only at upshift to the second speed ratio but also at downshift to the second speed ratio.

Although in the previously described embodiments, the control valve which can effect pressure modulation based on duty factor control has been used, another type of control valve may be used, for example, an electromagnetically controlled proportioning valve operative on a variation in voltage or amplitue of electric current supplied thereto.

Although in the previously described embodiments, the duty factor is fixed during the time period indicated by the timer value T, it is possible to vary the duty factor in accordance with the progress of time.

Although in the previously described embodiments, the friction element is controlled by the corresponding control valve. the characteristic of hydraulic fluid presure supplied to the friction element may be controlled in cooperation of such control valve with an orifice or an accumulator.

What is claimed is:

1. An automatic transmission comprising:
   a hydraulically operated friction element;
   a source of a first hydraulic fluid pressure;
   a shift valve having an inlet port communicating with said source of said first hydraulic fluid pressure and an outlet port;
   said shift valve having a position where said outlet port thereof communicates with said inlet port thereof to allow said first hydraulic fluid pressure to communicate with said outlet port thereof;
   a source of a second hydraulic fluid pressure having a constant pressure level;
   a control valve fluidly disposed between said outlet port of said shift valve and said friction element, said control valve including a pressure responsive spool means movable between a first position in which said first hydraulic fluid is supplied to said friction element from said outlet port of said shift valve and a second position in which said first hydraulic fluid pressure is blocked from said friction element and fluid discharge from said friction element is allowed, said control valve having a pressure chamber for receiving a hydraulic fluid pressure, said pressure responsive spool means having a land on which the hydraulic fluid pressure within said pressure chamber acts;
   a control unit generating an electrical control signal;
   means for defining a hydraulic fluid pressure passage having one end communicating with said source of second hydraulic fluid pressure and an opposite end communicating with said pressure chamber of said control valve; and
   a solenoid valve means disposed in said hydraulic fluid pressure passage for controlling the hydraulic fluid pressure within said pressure chamber of said control valve in response to said control signal.

2. An automatic transmission as claimed in claim 1, wherein said control unit varies said control signal with vehicle speed and engine torque.

3. An automatic transmission as claimed in claim 1, wherein said friction element is a clutch which is released when the transmission establishes a first speed ratio and a second speed ratio, but engaged when the transmission establishes a third speed ratio and a fourth speed ratio, and a torque capacity required on said clutch during operation with the third speed ratio is different from that required on said clutch during operation with the fourth speed ratio, and the hydraulic fluid pressure supplied to said clutch is variable to meet the torque capacity required on said clutch.

4. An automatic transmission as claimed in claim 1, wherein said friction element is a band brake having a band servo formed with a servo apply pressure chamber and a servo release pressure chamber on the opposite ends of a servo piston operatively connected with the band brake for applying or releasing the same such that pressurizing the servo apply pressure chamber only causes the servo piston to apply the band brake, while pressurizing both of the servo apply pressure chamber and servo release pressure chamber causes the servo piston to release the band brake, and the band brake is to be applied when the transmission shifts up to a second speed ratio and also when the transmission shifts down to the second speed ratio, and a torque capacity required on the band brake when the transmission shifts up to the second speed ratio is different from that required on the band brake when the transmission shifts down to the second speed ratio, and the characteristic of hydraulic fluid pressure supplied to the servo apply pressure chamber is modulated to meet the torque capacity required on the band brake.

5. An automatic transmission as claimed in claim 3, wherein said control valve is a clutch control valve communicating with said clutch.

6. An automatic transmission as claimed in claim 4, wherein said control valve is a servo apply control valve communicating with the servo apply pressure chamber.

7. An automatic transmission as claimed in claim 1, wherein said pressure responsive spool means of said control valve has a second land on which said second hydraulic fluid pressure acts.

8. An automatic transmission as claimed in claim 7, wherein said second land has a smaller pressure acting area than said first mentioned land.

9. An automatic transmission for an automotive vehicle having an engine, comprising:
- a plurality of friction elements including a predetermined friction element, the transmission being shiftable to one of a plurality of speed ratios by hydraulically engaging said predetermined friction element, and also to another one of the plurality of speed ratios by hydraulically engaging said predetermined friction element;
- a source of a first hydraulic fluid pressure;
- a shift valve having an inlet port communicating with said source of said first hydraulic fluid pressure and an outlet port;
- said shift valve having a position where said outlet port thereof communicates with said inlet port thereof to allow said first hydraulic fluid pressure to communicate with said outlet port thereof;
- a source of a second hydraulic fluid pressure having a constant pressure level;
- a control valve fluidly disposed between said outlet port of said shift valve and said friction element, said control valve including a pressure responsive spool means movable between a first position where said first hydraulic fluid pressure is supplied to said friction element from said outlet port of said shift valve and a second position where said first hydraulic fluid pressure is blocked from said friction element and fluid discharge from said friction element is allowed, said control valve having a pressure chamber for receiving hydraulic fluid pressure, said pressure responsive spool means having a land on which the hydraulic fluid pressure within said pressure chamber acts;
- a control unit including means for generating a first shift signal indicating that the transmission is to shift to the one of the plurality of speed ratios and a second shift signal indicating that the transmission is to shift to the another one of the plurality of speed ratios;
- means for defining a hydraulic fluid pressure passage having one end communicating said source of second hydraulic fluid pressure and an opposite end communicating with said pressure chamber of said control valve; and
- a solenoid valve means disposed in said hydraulic fluid pressure passage for controlling the hydraulic fluid pressure within said pressure chamber of said control valve in response to said first shift signal and said second shift signal.

10. An automatic transmission as claimed in claim 9, wherein said solenoid valve means includes a solenoid, and said control unit includes means for storing predetermined duty factors corresponding to various kinds of shift in speed ratio and retreievable in response to said first shift signal and second shift signal, and means for supplying electric current to said solenoid in ON/OFF manner with a duty factor selected from said storing means in response to the generation of said first shift signal or second shift signal.

11. An automatic transmission as claimed in claim 10, wherein said predetermined friction element is a clutch, and said control valve is a clutch control valve.

12. An automatic transmission as claimed in claim 9, wherein said pressure responsive spool means of said control valve has a second land on which said second hydraulic fluid pressure acts.

13. An automatic transmission as claimed in claim 12, wherein said second land has a smaller pressure acting area than said first mentioned land.

14. An automatic transmission for an automotive vehicle having an engine, comprising:
- a plurality of friction elements including a predetermined friction element, the transmission being shiftable up to a predetermined one of a plurality of speed ratios by hydraulically engaging said predetermined friction element, and the transmission being shiftable down to said predetermined one speed ratio by hydraulically engaging said predetermined friction element;
- a source of a first hydraulic fluid pressure;
- a shift valve having an inlet port communicating with said source of said first hydraulic fluid pressure and an outlet port;
- said shift valve having a position where said outlet port thereof communicates with said inlet port thereof to allow said first hydraulic fluid pressure to communicate with said outlet port thereof;
- a source of a second hydraulic fluid pressure having a constant pressure level;
- a control valve fluidly disposed between said outlet port of said shift valve and said friction element, said control valve including a pressure responsive spool means movable between a first position where said first hydraulic fluid pressure is supplied to said friction element from said outlet port of said shift valve and a second position where said first hydraulic fluid pressure is blocked from said friction element and fluid discharge from said friction element is allowed;
- a control unit including means for generating a first shift signal indicating that the transmission is to shift up to said predetermined speed ratio and a second shift signal indicating that the transmission is to shift down to said predetermined speed ratio;
- said control valve having a pressure chamber for receiving hydraulic fluid pressure, said pressure responsive spool means having a land on which the hydraulic fluid pressure within said pressure chamber acts;
- means for defining a hydraulic fluid pressure passage having one end communicating with said source of said second hydraulic fluid pressure and an opposite end communicating with said pressure chamber;
- a solenoid valve means disposed in said hydraulic fluid pressure passage for controlling the hydraulic fluid pressure within said pressure chamber of said control valve to vary said hydraulic fluid pressure within said pressure chamber of said control valve differently in response to said first shift signal and said second shift signal.

15. An automatic transmission as claimed in claim 14, wherein said solenoid valve means includes a solenoid, and said control unit includes means for storing predetermined duty factors corresponding to various kinds of shift in speed ratio and retreievable in response to said first shift signal and second shift signal, and means for supplying electric current to said solenoid in ON/OFF manner with a duty factor selected from said storing means in response to the generation of said first shift signal or second shift signal.

16. An automatic transmission as claimed in claim 14, wherein said predetermined friction element is a band brake, and said control valve is a servo apply control valve.

17. An automatic transmission as claimed in 14, wherein said pressure responsive spool means of said control valve has a second land on which said second hydraulic fluid pressure acts.

18. An automatic transmission as claimed in claim 17, wherein said second land has a smaller pressure acting area than said first mentioned land.

* * * * *